(12) United States Patent
Robi

(10) Patent No.: US 11,269,658 B2
(45) Date of Patent: Mar. 8, 2022

(54) METHOD FOR PARAMETERIZING A FIELD DEVICE

(71) Applicant: Endress+Hauser Conducta GmbH+Co. KG, Gerlingen (DE)

(72) Inventor: Stefan Robi, Hünxe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 175 days.

(21) Appl. No.: 16/710,514

(22) Filed: Dec. 11, 2019

(65) Prior Publication Data

US 2020/0183708 A1  Jun. 11, 2020

(30) Foreign Application Priority Data

Dec. 11, 2018 (DE) .................. 10 2018 131 701.8

(51) Int. Cl.
*G06F 9/44* (2018.01)
*G06F 9/445* (2018.01)
*G01D 7/08* (2006.01)

(52) U.S. Cl.
CPC ........... *G06F 9/44505* (2013.01); *G01D 7/08* (2013.01)

(58) Field of Classification Search
CPC ... G06F 1/12; G06F 1/32; G06F 21/57; G06F 1/28; G06F 9/44
See application file for complete search history.

(56) References Cited

U.S. PATENT DOCUMENTS

| 2002/0083228 | A1* | 6/2002 | Chiloyan | H04L 29/06 710/9 |
| 2006/0161359 | A1* | 7/2006 | Lalla | G01F 1/8431 702/65 |
| 2008/0216073 | A1* | 9/2008 | Yates | G06F 9/30189 718/100 |
| 2009/0306796 | A1* | 12/2009 | Budmiger | G05B 19/0423 700/86 |
| 2011/0231531 | A1* | 9/2011 | De Groot | G05B 19/41845 709/221 |
| 2012/0166609 | A1* | 6/2012 | Lux | G05B 19/042 709/223 |
| 2017/0093622 | A1* | 3/2017 | Wagener | H04L 41/12 |
| 2018/0204165 | A1* | 7/2018 | Yokota | F16K 11/105 |
| 2019/0286098 | A1* | 9/2019 | Weng | G05B 19/0426 |

* cited by examiner

*Primary Examiner* — Keshab R Pandey
(74) *Attorney, Agent, or Firm* — Mark A. Logan; Endress+Hauser (USA) Holding Inc.

(57) ABSTRACT

The present disclosure relates to a method for parameterizing a field device of process automation technology, comprising at least the following steps: parameterizing a mapping of the field device, wherein the mapping is executed as field-device-specific software on an interpreter, especially a software emulator; wherein the interpreter is executed on a host and there is no connection between host and field device during parameterization, and transmitting the parameterization generated via the mapping to the field device.

10 Claims, 3 Drawing Sheets

METHOD FOR PARAMETERIZING A FIELD DEVICE

CROSS-REFERENCE TO RELATED APPLICATION

The present application is related to and claims the priority benefit of German Patent Application No. 10 2018 131 701.8, filed on Dec. 11, 2018, the entire contents of which are incorporated herein by reference.

TECHNICAL FIELD

The present disclosure relates to a method for parameterizing at least one field device of process automation technology.

BACKGROUND

Field devices serving to capture and/or modify process variables are frequently used in process automation technology. Field devices, in general, refer to all devices which are process-oriented and which supply or process process-relevant information. Sensors, in particular, are to be mentioned here, but also actuators. Field devices designed as sensors can, for example, monitor process measurands, such as pressure, temperature, flow, and fill-level, or measurands in liquid and/or gas analysis, such as pH, conductivity, concentrations of certain ions, chemical compounds, and/or concentrations or partial pressures of gas.

During the construction of a process automation system, which comprises many field devices, frequently said measurands are already parameterized at the destination before the actual installation. As a rule, this is done by the system manufacturer in cooperation with the operator of the system. If the system is then ready, the predetermined parameters are loaded onto the field devices (the so-called "parameterization"). This is often referred to as an "offline" or "pre-" configuration.

SUMMARY

The aim of the present disclosure is to provide a simple, but completely comprehensive and error-free pre-configuration for field devices.

The object is achieved by a method comprising the steps of: parameterizing a mapping of the field device, wherein the mapping is executed as field-device-specific software on an interpreter, especially a software emulator, wherein the interpreter is executed on a host and there is no connection between host and field device during parameterization; and transmitting the parameterization generated via the mapping to the field device.

In order for the offline configuration to function without error, the dependencies of the adjustable parameters contained in the field device must be mapped without errors. For this purpose, dependency logic implemented in the field device must be simulated in the program used to generate the offline configuration. This ensures that parameters dependent on one another can only be modified in valid data combinations. These include, for example, value ranges of adjustable parameters or the number of permissible selection possibilities of a selection parameter. If the dependency logic implemented for this purpose in the offline configuration program does not correspond to that implemented in the field device, it can lead to rejection of the parameterization on the part of the field device or, in the worst case, to malfunctions when transmitting the offline parameterization into the field device.

Thus parameter dependencies, such as value ranges of parameters, the representation of a parameter, units of the parameters, also with dependencies such as of the operating mode, and, for example, the visibility of parameters, must be mapped. In addition, after the user has been parameterized, it must be validated whether the settings made are technically permissible at all.

A congruent and error-free mapping of a field device for offline parameterization, for example for the pre-configuration of a new system or for a customer purchasing a device via web interface, is only possible with a great deal of effort. In some circumstances, if a field device or even just the firmware version used changes, the program for pre-configuration may have to be modified or recreated.

The mapping is the virtual mapping of the entire, i.e. unchanged, field device logic.

The above-mentioned method does not result in asynchronicity between the field device and the mapping thereof, since the identical code which is executed on the field device is also executed on the host system via the interpreter, especially the software emulator. This ensures that the entire dependency logic of the real field device is also available during the offline configuration. Since no transformation of the dependency logic contained in the field device into the dependency logic used in the host system is required, but instead the dependency logic actually used in the field device is directly used via the interpreted or emulated execution of the field device software, a different execution of the dependency logic is excluded.

The user interface of the field device can thereby be made visible directly on the host, and the virtual field device can thereby be operated and configured in an identical manner in the host system, as would be the case in the real device. In one embodiment, an operator interface adapted to the respective host environment can additionally be implemented via suitable software interfaces in order to improve the operating comfort. An example of this is a representation in the form of an interactive web page in the case of a host which is embodied as a web server. In this case, for example, the mouse and keyboard of the user would be able to be used for the direct input of values and an operation that is awkward in this environment would not have to be effected by simulating the operating keys of the field device's on-site display.

In general, an interpreter is a computer program that, in contrast to assemblers and compilers, does not translate a program source code into a file that can be executed directly on the system, but reads, analyzes, and executes the source code. The analysis of the source code takes place during the runtime of the program.

In one embodiment, the interpreter is designed as an emulator—more precisely, as a software emulator. An emulator is an interpreter, since the former processes the machine code of the guest system command-by-command or in command sequences on a "virtual processor." In other words, the emulator is an executing unit that executes the machine code of a certain architecture. A system that emulates another system in certain partial respects is called an emulator. The simulated system receives the same data as, executes programs comparable to, and achieves results, with respect to certain problems, as similar as possible to those of the system to be emulated. Software emulators are programs that simulate computing units and thus allow the use of software for precisely this computing unit on a computing unit with a different architecture.

The interpreter can also be designed in the special form of an emulator, viz., in a virtual machine. The virtual machine can execute parts of the machine code of the guest system directly on the host system. The definition of "emulator" or "virtual machine" is not unambiguous in the literature, and is blurry. In the sense of this application, a "virtual machine" executes large parts of its commands natively on the CPU of the host system. Since many commands are executed directly on the CPU of the host system, the same CPU architecture must be used for the guest system as on the host system. In the process, the support of the processor and/or of the operating system of the host system is necessary, in order to allow for the abstraction between the guest system and the host system. During emulation, this is, however, not necessary. During emulation, a code deviating from the hardware or CPU can be executed. A common method is software emulation, which simulates all functions of individual hardware components in software. In this way, programs can be executed that were written for a different CPU. The software emulation can thus be realized in a platform-independent manner.

In one embodiment, the interpreter is designed as a script language interpreter.

In one embodiment, the script language can be Lua. "Lua" is an imperative script language that allows both functional and object-oriented programming. Lua has a high execution speed and its compiled script interpreter is small in size. Lua programs can be developed independently of the platform.

In one embodiment, one or more script language interpreters and/or emulators can be started in parallel on a host and also operated in parallel.

If the interpreter is started, a field-device-specific software is subsequently executed on it. The "field-device-specific software" is software that is not primarily a part of the host, i.e., it is explicitly not part of the host system. The field-device-specific software is loaded at runtime. The field-device-specific software is, in particular, loaded from a memory at runtime. The memory can in this case be implemented as memory firmly integrated into the hardware of the host (e.g., flash memory), in the form of removable memory accessible to the user (e.g., a memory card), or in the form of a network memory that is addressed by data communication (e.g., a file server).

In general, the field-device-specific software is thus software code that is formulated in a certain (programming) language and executed on the host. If the interpreter is designed as an emulator, the field-device-specific software is formulated in machine code. If the interpreter is designed as a script language interpreter, the field-device-specific software is formulated as specific software code—in the example mentioned above, as Lua code.

In one embodiment, several interpreters can be executed per measuring host. In one embodiment, the interpreter can be instantiated dynamically. The program code of the interpreter is located once on the host—more precisely, in the memory of the host—and is executed when an instance is called. An instance is in this respect a specific occurrence of an object, i.e., of the interpreter in this case, which exists (only) during its runtime. In one embodiment, several interpreters are already statically loaded.

The field-device-specific software thus constitutes, for instance, signal processing of sensor data, one or more state machines, menu navigation of the field device but, especially, the parameterization of the field device.

In one embodiment, field-device-specific software is transferred onto the host if it is not already located on the host.

The field-device-specific software has to be loaded once by the host in order to then execute it within its interpreter.

In one embodiment, the field-device-specific software is executed natively, especially as architecture-specific binary code, on the field device.

In one embodiment, the field device comprises an interpreter, especially a software emulator, and the field-device-specific software is executed thereon.

In one embodiment, the field-device-specific software is therefore created in a byte code which can be executed in an interpreter both in the field device and in the host system. In this case, the system complexity is significantly reduced, since all code-executing systems can only be equipped with an interpreter that can execute this standardized byte code.

In one embodiment, the field-device-specific software comprises a plurality of subfragments. In the case of a multi-channel device, for example, it is conceivable for the various sensors connected to the field device to transmit a part of the software running in the field device (e.g. signal processing routines and operating menu dialogs) into the field device during the initial connection between sensor and field device in order in this way to be flexibly connected thereto. Through this architecture, the field-device-specific software can therefore also be regarded as the entirety of the software components running in the field device.

In other words, the code running on the field device, either native or via the interpreter (see above), is also executed on a host system. The field device code can be loaded into the memory of the host either once in the case of a first connection between field device and host, or it is already available there in the form of a database of different field device codes, or is dynamically loaded via a data connection, for example from the Internet.

Especially when pre-parameterization is carried out, the field-device-specific software is already located on the host or is obtained, for example, via the Internet without a connection to the respective field device previously being required. This makes an offline parameterization of the field device possible, even in the case of an initial start-up, to which there was never a connection to the field device beforehand at the time of offline parameterization.

After termination of the offline parameterization, the parameters are transmitted to the field device. The transmission can take place in various ways. In one embodiment, this is a field bus such as Modbus, Profibus, field bus Foundation, HART, WirelessHART, via a web server, via Bluetooth, WLAN, or via a storage medium. The host itself need not be the direct communication partner; this can also take place via a further level, such as a control system.

Various architectures come into consideration as host.

First, FDT/DTM shall be discussed. FDT (field device tool) is a non-proprietary manufacturing concept in automation technology, which enables the parameterization of field devices. A device type manager (DTM) is not a stand-alone program, but instead functions only in cooperation with a FDT frame application. In terms of content, it represents a specific device or a communication component with its properties and functions, including user interface. From within a frame application, the DTMs enable operation with "their" devices or communication components that are in the installation. A user can call the functions of the connected devices via the associated DTMs. Device DTMs are drivers and have a device-specific construction. They contain data, functions and logic elements of the device. Depending on the degree of implementation, the driver includes a graphical user interface for adjusting the device parameters right up to applications for diagnosis and maintenance, e.g., device calibration logic. Device DTMs are typically developed by the device manufacturer.

The above-described problem with the necessary one-to-one mapping of the field device to provide a pre-configuration for field devices is thus especially clear in the FDT/DTM concept. The complexity for the manufacturer of field devices, and thus of DTMs, is very high.

In one embodiment, the host is therefore a device type manager (DTM) and the interpreter is executable therein as part of the device type manager.

This eliminates the need for a parallel development of different DTMs. Only a single DTM needs to be developed on which an interpreter can be executed. The corresponding field-device-specific software is executed in the interpreter. This is developed for the corresponding field device and can now be executed equally on different types of hosts.

In one embodiment, the host is a web server and the interpreter is executed on it.

In one embodiment, the host is a mobile device and the interpreter is executed thereon, especially as an app or as part of an app. The mobile device is, for example, a smartphone, tablet, phablet, notebook, netbook or a PDA.

The advantages mentioned in connection with an FDT/DTM apply equally to the execution of the host as a web server or on a mobile device. In the case of the web server, a user can parameterize a field device according to his expectations via the browser. By executing the identical code executed on the field device in the interpreter executed on the web server, it can be ensured, as already described above, that the parameterization or configuration thus created is completely consistent.

Due to the fact that the complete field-device-specific code is executed in the host, it can be verified at the time of offline parameterization by simulation of various states, for example different measured values, events or error states, that the adjustments made will have the desired effect in the field device. This aspect goes beyond the static pre-parameterization, for example via DTMs, since here only the parameterization per se, but not the complete device behavior, can be mapped.

In one embodiment, the current parameterization of the field device is first loaded from the field device to the host via a data connection before the start of the parameterization process. The data connection may be a wired connection or a wireless connection. However, the current parameterization can also be transmitted from the field device to the host via a field bus directly or via the control system. This ensures that the mapping also contains the current parameter configuration and that only the modified parameters are transmitted during the return transmission. In one embodiment, only modified parameters are transmitted.

The object is further achieved by a field device which is designed to use a method as described above, especially which is designed to receive parameterization generated via the mapping.

In one embodiment, the field device comprises a memory with field-device-specific software.

In one embodiment, the field device is designed as a measuring transducer. The measuring transducer is thereby configured especially as a multi-channel measuring transducer, i.e. a plurality of devices, for example sensors, can be connected to the measuring transducer.

In one embodiment, an interpreter, especially a software emulator, which is designed to execute the field-device-specific software, is executed on the measuring transducer.

In one embodiment, the field device is configured as a sensor for detecting measured values.

BRIEF DESCRIPTION OF THE DRAWINGS

This will be explained in more detail with reference to the following figures.

DETAILED DESCRIPTION

Figure 1A:
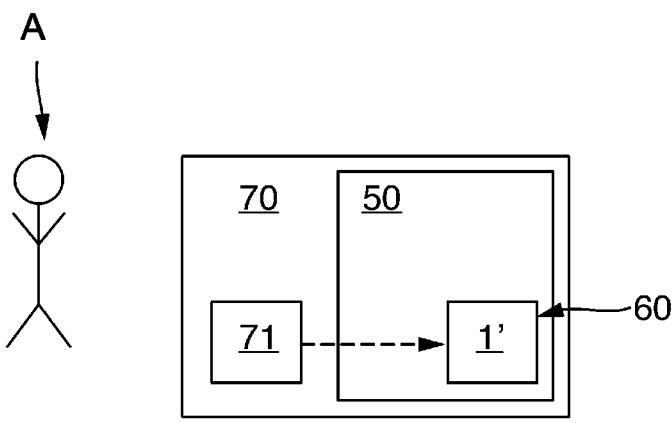
FIG. 1a/b shows a schematic overview of the claimed method.

In the figures, the same features are identified with the same reference characters.

FIG. 1a shows a schematic overview of the first step of the claimed method. A user A parameterizes thereby a mapping 1' of a field device 1. The field device 1 is, for example, a sensor 5. The field device 1 is, however, also a measuring transducer 20, for example. In the following, a "field device" should always be understood to mean a measuring transducer, unless otherwise mentioned.

The mapping 1' is a field-device-specific software 60 which is executed in an interpreter 50. The interpreter 50 is executed on the host 70. There is no connection between the host 70 and the actual, i.e. real, field device 1.

The interpreter 50 is embodied as an emulator, more precisely as a software emulator.

The interpreter 50 executes the machine code of the guest system, that is, the mapping 1' in the form of the field-device-specific software 60 on a virtual processor on the host 70.

In general, a system that simulates another system in certain partial aspects is called an emulator. The simulated system receives the same data as, executes the same programs as or at least programs comparable to, and achieves results as similar as possible to the system to be emulated. Software emulators are programs that simulate a computer and thus allow the use of software for this computer on a computer with a different architecture.

In the interpreter 50, at least one—preferably, precisely one—field-device-specific software 60 (per interpreter 50) is executed. Several interpreters 50 can be executed per host 70.

In one embodiment, the interpreter 50 is not designed as an emulator, but as a script language interpreter. In one embodiment, this script language is Lua. Other examples are Python, VBA, Lisp, VBScript, or JScript. It is basically also possible to install and start various script language interpreters on a host 70. When several interpreters 50 are executed on a host, the individual interpreters 50 communicate with one another by means of standardized interfaces. In general, the interfaces are defined as a central part of the overall system infrastructure and are designed to be compatible over years, even if in the future extensions and modifications are performed, for example a different type of data types, such as the transmission of complex spectra instead of measured values, which are typically transmitted as a value with the corresponding unit.

Various embodiments are possible for the host 70. The respective host comprises a corresponding interpreter, wherein the field-device-specific software 60 executable thereon is always the same. In one embodiment, the interpreter 50 is embodied as a common part on all possible architectures of the host 70; only the necessary interfaces with its respective own components, such as the respective input and output possibilities, are specific to the respective host and are adapted accordingly. In doing so, the interpreter 50 can, for example, be written in a cross-platform programming language, such as C, so that the source code of the interpreter is, in principle, then the same for all different platforms.

The host 70 is executed, for example, as a device type manager (DTM). An interpreter 50 is executed as part of the DTM.

Also, the host 70 may be designed as a web server and the interpreter 50 executed thereon.

The host 70 can also be designed as a mobile device on which the interpreter is executed, for instance as an app.

The field-device-specific software 60 thus constitutes signal processing of sensor data (see below), one or more state machines, parameterization of the field device 1, menu navigation of the field device 1, or a field bus connection of the field device 1.

It makes no difference to the user A whether the field device 1 is operated directly or whether the mapping 1' is accessed via the interpreter 50 in the host 70. The menu navigation with all menus, together with possible parameter settings, is mapped exactly, since the mapping 1' is realized from the same software which is executed in field device 1.

To this end, the field-device-specific components must be loaded once onto the host 70 in order to subsequently be executed within its interpreter 50. There are various possibilities for this, which will be discussed in the following.

For this purpose, the host 70 comprises a memory 71 on which the field-device-specific software 60 is stored. The field-device-specific software 60 is loaded into the emulator 50 from the memory 71 which is indicated in FIG. 1*a* by the dashed arrow. Alternatively or in addition to storing the field-device-specific software 60 in the memory 71, host 70 comprises a connectivity for an external memory, such as a memory card (for instance an SD card). In an alternative, the host 70 establishes a data connection to the Internet and downloads the software appropriate to the respective field device 1 or 1'. Based upon a unique identification of the field device 1, the correct software is found in each case.

The user A thus parameterizes the mapping 1' of the field device 1 in the host 70. The user thus undertakes a complete parameterization P of the field device.

It is possible for the presently current parameterization of the field device 1 to be initially transmitted from the field device 1 to the host 70 so that the most current version of the parameters is present on the host. The transmission is effected, for example, via a backup of the device parameterization, for example on an SD card, via a field bus, Ethernet or a radio connection.

Figure 1B:
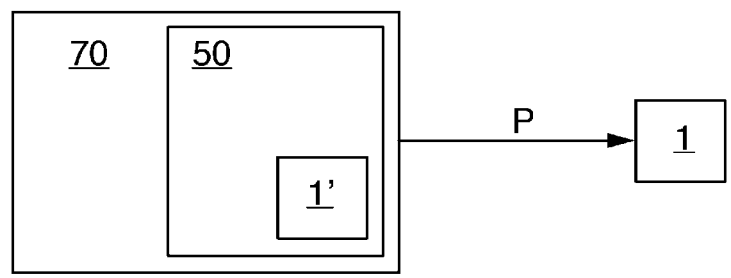

In the next step, see FIG. 1*b* the parameterization P is transmitted from the host 70 to the real field device 1. The field device 1 receives the parameterization P and populates either the entire parameterization. Alternatively, only the differences from the presently current parameterization are populated. The presently current parameterization of the field device 1 is thereby overwritten in each case by the offline parameterization P effected.

As mentioned, field device 1 is embodied as a measuring transducer 20, see also below and especially FIG. 3*a/b*. The measuring transducer can also be embodied as a multi-channel measuring transducer. A sensor 5 or a plurality of sensors ("multi-channel") can be connected to the measuring transducer 20.

Figure 2:
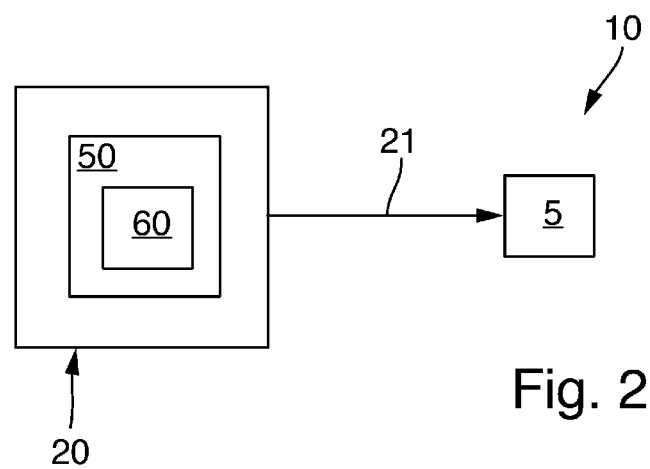
FIG. 2 shows a measuring transducer with field-device-specific software.

The measuring transducer 20 may comprise an interpreter 50 as shown in FIG. 2. The same applies to this interpreter as was stated above with respect to an interpreter 50 on a host 70. The field-device-specific software 60 as mapping 1' of the field device 1, i.e. of the measuring transducer 20, can be run on the interpreter 50. It is thus possible that large parts of the software of the measuring transducer are not executed "natively" i.e. directly by a CPU, but rather in an interpreter 50. Thus, one or more state machines, the parameterization of the measuring transducer 20, its menu navigation or the field bus connection run in the interpreter 50.

In this case, the measuring transducer 20 represents an embodiment of a host 70.

The entire parameterization P of the measuring transducer 20 is formed by the parameters contained therein. There are, on the one hand, parameters relating to the connected sensor 5, for example a temperature offset correction. On the other hand, there are parameters relating to the measuring transducer 20 itself, for instance a current output configuration (e.g. current spreading). Both types of parameters can be directly adjusted "natively" in the measuring transducer, for example via an operating interface present there (e.g. via display 22, which can also be embodied as a touchscreen, or via buttons, switches, etc. present on the measuring transducer).

Field device specific software 60 running in the measuring transducer 20 includes, inter alia, the totality of all parameters provided by the measuring transducer 20, i.e., measuring-transducer-specific and sensor-specific parameters. By virtue of the fact that the field-device-specific software 60 can be executed in the form of a mapping 1' in an interpreter 50 of a host 70, the adjusting of said parameters is also possible in the host 70.

If the field-device-specific software 60 is constructed from a plurality of partial fragments, for example by measuring-transducer-specific and sensor-specific fragments, the number of adjustable parameters depends on the specific physical interconnection of the field device 1. This applies especially to multi-channel measuring transducers to which any combination of sensors can be connected. If the physical interconnection of field device 1 is known, the same manifestation of the field-device-specific software 60 can thus be formed in the host 70 and executed as mapping 1' in the interpreter 50.

Figure 3A:
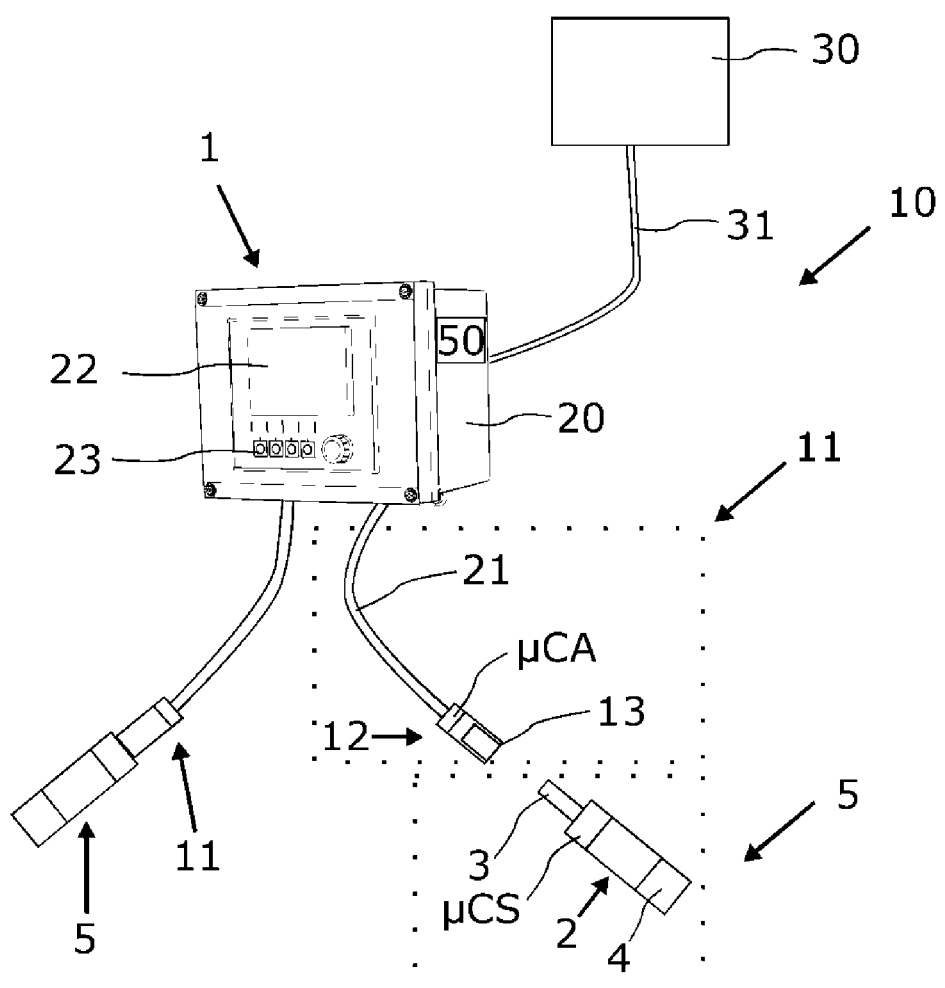
FIG. 3a/b shows a measurement arrangement comprising a measuring transducer in two different embodiments.
Figure 3B:
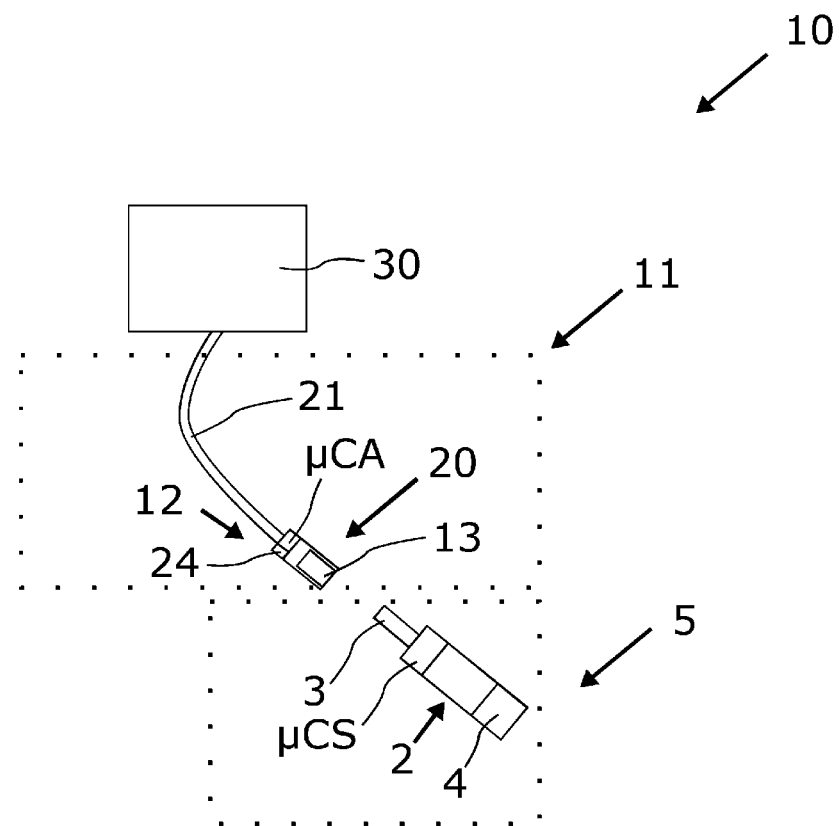

FIGS. 3*a* and 3*b* show a sensor arrangement 10 with a measuring transducer 20 for executing the method.

The claimed measuring transducer 20 is used, for example, in a sensor arrangement 10. The sensor arrangement 10 comprises a sensor 5 and a connection element 11, which shall be discussed first.

A sensor 5 communicates with the measuring transducer 20 via a first physical interface 3. An alternative word for measuring transducer is transmitter. The measuring transducer 20 in turn is connected to a higher-level unit 30, such as a control system, by a cable 31. A cable 21 is connected on the sensor side to the measuring transducer 20, the cable's other end comprising a second physical interface 13 that is complementary to the first physical interface 3. A connection element 11 comprises the cable 21, along with the second physical interface 13. The physical interfaces 3, 13 are designed as electrically isolated, especially inductive, interfaces. The physical interfaces 3, 13 can be coupled with each other by means of a mechanical plug connection. The mechanical plug connection is hermetically sealed, so that no fluid, such as the medium to be measured, air, or dust, can enter from the outside.

Data (bi-directional) and power (uni-directional, i.e., from the connection element 11 to the sensor 5) are transmitted or transferred via the physical interfaces 3, 13. Sensor assembly 10 is used predominantly in process automation.

The sensor 5 comprises at least one sensor element 4 for detecting a measurand of process automation. The sensor 5 is then, for example, a pH sensor, also [called] ISFET, generally an ion-selective sensor, a sensor for measurement of the redox potential, from the absorption of electromagnetic waves in the medium, e.g., with wavelengths in the UV, IR, and/or visible range, of the oxygen, of the conductivity, of the turbidity, of the concentration of non-metallic materials, or of the temperature, along with the respectively corresponding measurand.

The sensor 5 further comprises a first coupling body 2, which comprises the first physical interface 3. As mentioned, the first physical interface 3 is designed for the transmission to a second physical interface 13 of a value that is a function of the measurand. The sensor 5 comprises a data processing unit µCS, such as a microcontroller, which processes the values of the measurand, e.g., converts them into a different data format. The data processing unit µCS is designed for energy and space reasons to be rather small or economical with respect to the computing capacity and the memory volume. The sensor 5 is thus designed only for "simple" computing operations—for example, for averaging, preprocessing, and digital conversion.

Several sensors 5 can also be connected to a measuring transducer 20. Shown in FIG. 3a are two sensors 5, wherein only one of the two is provided with all of the reference characters. The same or different sensors can be connected. The left one of the two is shown in the plugged-in state. If the measuring transducer 20 is embodied as a multi-channel measuring transducer, up to eight sensors 5 can be connected, for example.

The sensor 5 can be connected via the physical interfaces 3, 13 to the connection element 11, and ultimately to the measuring transducer 20. The data processing unit µCS converts the value that depends upon the measurand (i.e., the measurement signal of the sensor element 4) into a protocol that the measuring transducer 20 can understand. An example in this regard is, for example, the applicant's proprietary Memosens protocol. The first and second physical interfaces 3, 13 are thus designed for the bi-directional communication between the sensor 5 and the measuring transducer 20. As mentioned, in addition to the communication, the first and second physical interfaces 3, 13 also ensure the supply of power to the sensor 5.

The connection element 11 comprises the second physical interface 13, wherein the second physical interface 13 is designed to be complementary to the first physical interface 3. The connection element 11 likewise comprises a data processing unit µCA. The data processing unit µCA may serve as a repeater for the transmitted signal. Furthermore, the data processing unit µCA can convert or modify the protocol.

The connection element 11 comprises a second, cylindrical coupling body 12 that is designed to be complementary to the first coupling body 2 and can be slipped with a sleeve-like end portion onto the first coupling body 2, wherein the second physical interface 13 is plugged into the first physical interface 3. An opposite arrangement, in which the second physical interface 13 is designed to be sleeve-like and the first physical interface 3 is designed to be plug-like, is possible, without any inventive effort.

The measuring transducer 20 comprises a display 22 and one or more operating elements 23, such as buttons or rotary buttons, by means of which the measuring transducer 20 can be operated. Measured data, for example, of the sensor 5 are displayed by the display 22. The sensor 5 can also be configured and parameterized by means of the operating elements 23 and the corresponding view on the display 22.

The measuring transducer 20 forwards (communication 35) the measured data of the sensor 5 via the cable 31, as mentioned, to a control system 30, for example. The control system 30 is in this case designed as a process control system (PLC, SPS), PC, or server.

To this end, the measuring transducer 20 converts the data into a data format that the control system can understand, e.g., into a corresponding bus, such as HART, Profibus PA, Profibus DP, Foundation Fieldbus, Modbus RS485, or even into an Ethernet-based field bus, such as EtherNet/IP, Profinet, or Modbus/TCP. These data are then forwarded to the control system 30. This can, if required, be combined with a web server, i.e., they can be operated in parallel to one another.

FIG. 3b represents an embodiment of a sensor arrangement 10. In this case, only one sensor 5 is respectively connected to a measuring transducer 20. The measuring transducer 20 is in this case illustrated symbolically as a rectangle, is smaller in its dimensions than the measuring transducer from FIG. 3a, and is approximately the size of a matchbox. The measuring transducer 20 can in this case be designed as a separate unit that can be connected to the cable 21 or, as shown here, be integrated directly into the cable 21. The measuring transducer 20 thus consists essentially of the data processing unit µCA. The measuring transducer 20 does not comprise a display and has, if any, only one or two operating elements, which are configured for a reset or for turning on and off. In this embodiment, the measuring transducer 20 preferably comprises no operating elements. The measuring transducer 20 therefore comprises a wireless module 24, such as a Bluetooth module, with the Bluetooth Low Energy protocol stack. A mobile device (not shown), such as a cellphone, tablet, laptop, etc., can thereby be wirelessly connected to the measuring transducer 20. By means of the mobile device, the sensor 5 can be configured and parameterized using the wireless connection via the wireless module 24. The measuring transducer 20 converts the raw measured data such that they are directly transmitted to a higher-level unit 30, such as the control system. As mentioned, data can, for example, be transmitted in a proprietary protocol from the sensor 5 to the connection element 11, while the data processing unit µCA converts this proprietary protocol into a bus protocol (Modbus, Foundation field bus, HART, Profibus, EtherNet/IP; see above). The measuring transducers in FIG. 3a and FIG. 3b essentially have the same basic functionality.

What is claimed is:

1. A method for parameterizing a field device of process automation technology, comprising the steps of:
    providing a field-device-specific software, wherein the field-device-specific software includes an entirety of software components of the field device;
    providing a host and an interpreter running on the host;
    executing the field-device-specific software on the interpreter on the host;

parameterizing the field-device-specific software running on the interpreter, wherein there is no connection between host and field device during parameterization; and transmitting the parameterization generated via the field-device-specific software to the field device.

2. The method according to claim 1, wherein the host is a device type manager (DTM) and the interpreter is executable in the device type manager as part of the device type manager.

3. The method according to claim 1, wherein the host is a web server and the interpreter is executed on the web server.

4. The method according to claim 1, wherein the host is a mobile device and the interpreter is executed thereon as an app or as part of an app.

5. The method according to claim 1,
wherein the host includes a memory which stores the field-device-specific software and holds the field-device-specific software available, and
wherein the field-device-specific software can be reloaded via a data carrier or via a data connection of the host.

6. The method according to claim 5, wherein the field-device-specific software includes a plurality of subfragments.

7. The method according to claim 1, wherein a current parameterization of the field device is first loaded from the field device to the host via a data connection before the start of the parameterization process.

8. The method according to claim 5, wherein the field-device-specific software is first loaded directly from the field device to be parameterized to the host via a data connection.

9. The method according to claim 1,
wherein the interpreter includes a software emulator and a virtual processor, and
wherein the executing of the field-device-specific software includes executing field-device-specific software machine code on the emulator and the virtual processor on the host.

10. A method for parameterizing a field device of process automation technology, comprising the steps of:
parameterizing a mapping of the field device, wherein the mapping is executed as field-device-specific software on an interpreter, wherein the interpreter is executed on a host and there is no connection between host and field device during parameterization; and
transmitting the parameterization generated via the mapping to the field device,
wherein the host includes a memory which stores field-device-specific software and holds the field-device-specific software available,
wherein the field-device-specific software can be reloaded via a data carrier or via a data connection of the host, and
wherein the field-device-specific software is first loaded directly from the field device to be parameterized to the host via a data connection.

* * * * *